United States Patent Office 3,764,347
Patented Oct. 9, 1973

3,764,347
NO-CHOLESTEROL MAYONNAISE-TYPE
SALAD DRESSING
Joseph J. Katz, Baltimore, Md., assignor to United
Food Industries, Inc., Baltimore, Md.
No Drawing. Filed May 12, 1971, Ser. No. 142,759
Int. Cl. A23l 1/24
U.S. Cl. 426—196                     9 Claims

ABSTRACT OF THE DISCLOSURE

A no-cholesterol salad dressing of the mayonnaise type having good storage capabilities containing by weight 20–60 parts starch, 1–12 parts egg white and 30–70 parts vegetable oil. An emulsifier and a chelating agent are optional ingredients.

This invention relates generally to a salad dressing of the mayonnaise type. More specifically, the present invention is concerned with a salad dressing without any cholesterol and which possesses improved storage characteristics.

BACKGROUND OF THE INVENTION

Mayonnaise-type salad dressings have been well known consumer products, and although there are many different types of salad dressings, mayonnaise remains a very popular, although somewhat more expensive, product than many other salad dressings. It is also well known that salad dressings, in order to be properly labeled "mayonnaise," must contain a minimum amount of egg yolk. The composition has been set in the Federal Standards which requires the presence of at least 4% of egg yolk and all mayonnaise products so labeled must include this minimum amount of egg yolk.

The presence of egg yolk, while desirable for its flavor and its emulsifying effect, nevertheless possesses two serious drawbacks which has limited both the wider use of mayonnaise as a salad dressing and its storage capability between the time of manufacture and the ultimate use by the consumer.

First, egg yolk is composed of cholesterol which has been recognized by various medical authorities as being an undesirable constituent, above certain prescribed levels, in the blood of humans, particularly adult males. It is believed, and widely accepted, that high cholesterol content in the blood is a leading cause for a heart attack. Accordingly, the presence of egg yolk in mayonnaise produces an undesirable level of cholesterol in all mayonnaise products and renders them unacceptable in the diet of many who are knowledgeable and concerned over the presence of cholesterol in foods that are part of a common diet.

The other inherent characteristic of egg yolks which makes them an undesirable, although legally necessary, constituent of mayonnaise is the fact that the shelf life of mayonnaise is at best within a range of three to four months. Eggs, and particularly egg yolks, are a principal factor in the reduced storage capability due to the inpresence of cholesterol in foods that art part of a comherent susceptibility of egg to microbiological spoilage. The egg yolk may initially contain various microorganisms prior to the incorporation of the egg yolk into mayonnaise and in time, even with sanitary manufacturing conditions, the growth of the microorganisms in the egg yolk spreads to ultimately contaminate and spoil the entire mayonnaise product. The growth of these microorganisms is further enhanced by the opening of the mayonnaise container by the consumer.

Many attempts have been made in the prior art to overcome these undesirable features of mayonnaise. For instance, U.S. Pat. 2,844,470 discloses a method of pasteurizing the egg yolk material so as to limit the introduction of the microorganisms otherwise present in the egg material.

Other approaches such as disclosed in Gelfand, U.S. Pat. 2,111,766, suggest the reduction in the amount of egg material or the omission of egg material completely when the salad dressing is made with a pure pineapple juice constituent.

Other prior art efforts as disclosed in U.S. Pats. 3,093,485 to Partyka and 3,093,486 to Krett require the use of egg yolk for the emulsifying effect essential in producing emulsified salad dressing of the mayonnaise type.

OBJECTS OF THE INVENTION

It is the principal object of the present invention to provide an improved salad dressing of the mayonnaise type which possesses no cholesterol content and which has improved storage life.

A further object of the present invention is the provision of a mayonnaise-type salad dressing in which egg yolk is not present, but which contains egg white.

A further object of the present invention is the offsetting of the omission of the egg yolk and the emulsifying effect attributable to the egg yolk through the use of egg white.

This invention also has as an object the provision of improved salad dressing of the mayonnaise type which has the taste, texture, and appearance of mayonnaise, but has at least a 50% increase in storage life while not adding to the cholesterol intake.

SUMMARY OF THE INVENTION

It has been discovered that a salad dressing of the mayonnaise type may be prepared without egg yolk while having improved storage characteristics if egg white is included as the only portion of the egg used along with starch and vegetable oil. An emulsifier and a chelating agent are optional to improve the quality of the product.

DESCRIPTION OF A PREFERRED EMBODIMENT

In order to provide a salad dressing of the mayonnaise type which omitted the egg yolk and therefore omitted one of the important ingredients which would provide an emulsifying action as well as flavor, texture and appearance, it was necessary to substitute something for the egg yolk and the desirable aspects of its function, i.e., emulsification. It was discovered that egg white alone is an effective stabilizing or suspending agent and does not provide the same limitations upon storage as does the use of egg yolk alone.

Accordingly, it has been found that egg white in an amount between 1 and 12 parts by weight and preferably 3 to 9 parts by weight will produce a stable suspension between oil and starch which are the other essential ingredients.

The oil that is to be used should be of vegetable origin and can be any one of a number of such oils such as soybean, corn, cottonseed, peanut, palm, cocoanut and safflower oil. The amount of the vegetable oil may range from 30 to 70 parts by weight but preferably is 35 to 50 parts by weight.

The starch constituent of the salad dressing of the present invention is a conventional ingredient and may be derived from corn or tapioca or other vegetable. The starch is formed into a paste with sufficient water to gelatinize the starch through heating well known in the art and disclosed in the previously mentioned patents. As used hereinafter the term starch refers to starch paste which may or may not include the sugar and water and starch. The conventional spices may include between 2 to 6 parts by weight of the total composition and may be incorporated into the starch paste or added subsequently. The starch paste may, for instance, contain from 5 to 30 parts by weight sugar and 30 to 80 parts by weight water per part starch. The amount of the starch paste may range from 20-60 parts by weight but preferably 40-55 parts by weight.

A salad dressing made in accordance with the foregoing ingredients along with the possible addition of the five parts by weight vinegar will make an acceptable salad dressing similar in taste, texture and appearance to that of mayonnaise.

EXAMPLE 1

| | Parts by weight |
|---|---|
| Starch paste | 47.2 |
| Egg white | 5.64 |
| Spices | 3.19 |
| Soybean oil | 43.04 |
| Vinegar | 1.00 |

In order to mix the ingredients to obtain satisfactory and stable suspension, the egg white is to be added to the starch paste in the mixture while mixing, thereafter the soybean oil and vinegar are added. To enhance the coloring, if desired, oleo resin of paprika solution may be added with the soybean oil. The mixing is usually complete in about five minutes, and thereafter, the premixed ingredients are pumped through a colloid mill in about six minutes in order to obtain the stable suspension.

While the foregoing composition produces a very satisfactory product, it is possible to substantially enhance the quality of the taste, texture and appearance as well as to improve the stabiliy of the suspension by incorporation of optional ingredients such as an inert, non-toxic emulsifier and chelating agent.

The emulsifier is any one of the natural plant hydrocolloids or gums such as tragacanth, carrageenin, karaya, ghatti, arabic, agar, locust bean, pectin, pectinates, guar, algin and the alginates. The alginates may be any of the alkaline metal salts of alginic acid such as sodium, calcium or the glycerol esters of the algins or algenic acid. Also carboxy methyl cellulose may be used. Any other emulsifier that is inert and non-toxic to human use may be used. Among those found useful but not in any way limiting are the non-ionic compounds derived from the condensation of fatty substances such as acids, alcohol, amines, amides and alkanolamines with ethylene oxide. Included in this grouping are the polyoxyethylene sorbitan fatty acid esters such as monooleate, stearate, palmitate, laurate, etc., generally known as a "Tween." Still other non-ionic emulsifiers useful include the fatty acid esters of sorbitan or monnitan and other polyglycols and their partial anhydrides. The term fatty acids shall include all organic, monocarboxylic acids, saturated and unsaturated having 5-18 carbon atoms. Within this group are those commonly known as "Span," a sorbitan ester of oleic, stearic, palmitic, lauric, etc., fatty acids. The above emulsifiers may be present in amounts between .05 and .2 part by weight, preferably .07 to .15 part by weight.

The purpose of the emulsifier is to effect even greater stability than that produced by the egg white. The emulsifiers, however, will not be adequate to produce the desired results and obtain the shelf life stability without the presence of egg white. The egg white alone, though, will provide sufficient stability to make the use of the emulsifier optional.

It is also contemplated as a preferred aspect of the invention to incorporate a chelating agent such as the sodium salt of ethylene diamine tetraacetic acid (EDTA). The EDTA is preferably incorporated in amounts ranging from .0001 to .01 part by weight, more preferably may be from .005 to .01 part by weight.

A typical example of the salad dressing of the mayonnaise type having no cholesterol present is shown in the following preferred embodiment.

EXAMPLE 2

| | Parts by weight |
|---|---|
| Starch paste | 47.02 |
| Egg white | 5.64 |
| Algin derivative (sodium alginate) | .1 |
| EDTA | .01 |
| Spice blend | 3.19 |
| Safflower oil | 43.04 |
| Vinegar | 1 |

The procedure in combining the various ingredients shuold be followed in order to produce the most stable suspension may be as follows:

(A) Blend the spices such as the salt, sugar, mustard, onion powder and soluble pepper.

(B) Dissolve the EDTA in about 1 pint of water mix for about one minute.

(C) Dissolve the sodium alginate in the safflower oil in amounts between ½ gallon to 1 gallon of oil to approximately 1 pound of the alginate mix for about two minutes.

(D) Combine the ingredients in the premixer in the following order:

Starch paste (previously made as stated above); egg white; alginate and oil mixture in (C) above; EDTA-water from (B) above; spice (from (A) above); remainder of the safflower oil and vinegar which may be 1 to 5 parts by weight although it is optional; and a minor amount of oleo resin of paprika solution in amount to give the desired color. Agitate for about 5 minutes while adding the ingredients.

(E) After having been premixed, the ingredients should be passed through a colloid mill in about 6 minutes.

The product produced in accordance with the foregoing composition is found to have a shelf life between 6 and 9 months and contains no cholesterol. Its appearance, taste and texture is that of mayonnaise commonly available in the commercial market.

While various changes and modifications may be made in the foregoing procedure such as substitutions in the oil, starch or in the emulsifier or chelating agent, the principal concept as outlined in the foregoing description reproduces a novel salad dressing meeting the stated objects of invention.

I claim:

1. A salad dressing of the mayonnaise type without egg yolk, having no cholesterol and long storage characteristics consisting essentially of a stable suspension of 20-60 parts by weight starch paste, 1-12 parts by weight egg white and 30-70 parts by weight vegetable oil.

2. The salad dressing of claim 1 including .05-.2 part of an inert, non-toxic emulsifier.

3. The salad dressing of claim 1 including .0001-.01 part of a chelating agent selected from the group consisting of the sodium salts of ethylene diamine tetraacetic acid.

4. The salad dressing of claim 1 including .05-.2 part of an emulsifier and .0001-.01 part of a chelating agent selected from the group consisting of the sodium salts of ethylene diamine tetraacetic acid.

5. The salad dressing of claim 1 wherein the vegetable oil is selected from the group consisting of soybean, corn, cottonseed, peanut, palm, cocoanut and safflower oils.

6. The salad dressing of claim 2 wherein the emulsifier is selected from the group consisting of the gums tragacanth, carrageenin, karaya, ghatti, arabic, agar, locust bean, pectin, pectinates, guar, algin and the alginates, carboxy methyl cellulose, and the non-ionic compounds derived from the condensation of fatty substances with ethylene oxide, and fatty acid esters of polyglycols and partial anhydrides.

7. The salad dressing of claim 4 wherein the emulsifier is selected from the group consisting of the gums tragacanth, carrageenin, karaya, ghatti, arabic, agar, locust bean, pectin, pectinates, guar, algin and the alginates, carboxy methyl cellulose, and the non-ionic compounds derived from the condensation of fatty substances with ethylene oxide, and fatty acid esters of polyglycols and partial anhydrides.

8. The salad dressing of claim 2 wherein the parts by weight are starch paste 40–55, egg white 3–9, emulsifier .07–.15 and vegetable oil 35–50.

9. The salad dressing of claim 8 including .005–.10 part of a chelating agent selected from the group consisting of the sodium salts of ethylene diamine tetraacetic acid and wherein the emulsifier is selected from the group consisting of the gums tragacanth, carrageenin, karaya, ghatti, arabic, agar, locust bean, pectin, pectinates, guar, algin and the alginates, carboxy methyl cellulose and the non-ionic compounds derived from the condensation of fatty substances with ethylene oxide, and fatty acid esters of polyglycols and partial anhydrides.

References Cited
UNITED STATES PATENTS

| | | | |
|---|---|---|---|
| 2,111,766 | 3/1938 | Gelfand | 99—144 |
| 2,944,906 | 7/1960 | Spitzer et al. | 99—144 |
| 3,207,609 | 9/1965 | Gorman et al. | |
| 2,885,292 | 5/1959 | Stapf | 99—144 |

ALVIN E. TANENHOLTZ, Primary Examiner

J. M. HUNTER, Assistant Examiner

U.S. Cl. X.R.

426—213